United States Patent [19]

Honjo et al.

[11] Patent Number: 5,782,694
[45] Date of Patent: Jul. 21, 1998

[54] DAMPER DISC ASSEMBLY HAVING A PLATE FORMED WITH LUBRICATING MEMBERS FOR REDUCING FRICTION CAUSED BY ENGAGEMENT WITH DAMPER SPRINGS

[75] Inventors: Hisashi Honjo, Moriguchi; Ikuo Murata, Neyagawa; Hideyuki Imanaka, Moriguchi; Hiroyuki Matsubara, Neyagawa, all of Japan

[73] Assignee: Exedy Corporation, Osaka, Japan

[21] Appl. No.: 676,659

[22] Filed: Jul. 10, 1996

[30] Foreign Application Priority Data

Jul. 21, 1995 [JP] Japan ................... 7-186042
Sep. 12, 1995 [JP] Japan ................... 7-234389

[51] Int. Cl.$^6$ .................... F16D 3/14; F16D 3/52
[52] U.S. Cl. ................... 464/64; 184/14.1; 464/68; 464/7; 464/9; 192/213.2; 192/113.5
[58] Field of Search .................... 464/64, 66, 68, 464/7, 8, 9; 192/113.5, 212, 213.2; 184/14.1

[56] References Cited

U.S. PATENT DOCUMENTS

| | | |
|---|---|---|
| 1,232,443 | 7/1917 | Turner .................... 184/14.1 X |
| 1,413,963 | 4/1922 | Buckley .................... 184/14.1 |
| 1,774,254 | 8/1930 | Daukus .................... 192/113.5 X |
| 2,107,455 | 2/1938 | Thompson .................... 184/14.1 X |
| 3,271,978 | 9/1966 | Berna .................... 464/7 X |
| 4,006,809 | 2/1977 | Seino et al. .................... 129/113.5 X |
| 4,626,226 | 12/1986 | Kajikawa et al. .................... 464/64 |
| 4,633,989 | 1/1987 | Yoneda . |
| 4,782,718 | 11/1988 | Hartig et al. . |
| 4,816,006 | 3/1989 | Friedmann .................... 464/68 X |
| 4,848,551 | 7/1989 | Caspar . |
| 4,884,996 | 12/1989 | Schmitt et al. .................... 464/68 |
| 4,946,420 | 8/1990 | Jackel .................... 464/7 |
| 5,090,542 | 2/1992 | Brunken .................... 192/212 X |
| 5,146,811 | 9/1992 | Jackel .................... 464/64 X |
| 5,261,516 | 11/1993 | Friedmann .................... 464/68 X |
| 5,377,796 | 1/1995 | Friedmann et al. .................... 464/68 X |

FOREIGN PATENT DOCUMENTS

| | | |
|---|---|---|
| 3507076 | 9/1985 | Germany . |
| 3515928 | 11/1986 | Germany . |
| 3542847 | 6/1987 | Germany . |
| 3624496 | 1/1988 | Germany . |
| 19611029 | 10/1996 | Germany . |
| 57-167523 | 10/1982 | Japan . |

*Primary Examiner*—Daniel P. Stodola
*Assistant Examiner*—Gregory J. Strimbu
*Attorney, Agent, or Firm*—Shinjyu Office of Patent Attorneys

[57] ABSTRACT

A clutch disc assembly (1) is provided with lubrication members (11a, 11b) to reduce the wear of the parts which contact the large coil springs (7) disposed within the clutch disc assembly (1). Plates (4) and (5) and a separated flange (3) are configured to rotate relative to each other. Raised portions (4a) and (5a) of the plates (4) and (5) correspond to a window (3c). Each of the large coil springs (7) extends in a circumferential direction with respect to the clutch disc assembly (1). Each large coil spring is confined within a corresponding the window (3c) of the separated flange (3) and further between the raised portions (4a) and (5a) of the plates (4) and (5). Lubricant-impregnated members (11a, 11b) are provided on a portion of respective sides of the separated flange (3), and are contactable with the large spring coil (7). In one alternate embodiment, a portion of plates (105) and (106) is provided with a plurality of minute apertures (140). The plates (105) and (106) are then provided with a surface hardened layer (130) to reduce wear due to friction.

11 Claims, 7 Drawing Sheets

DAMPER DISC ASSEMBLY HAVING A PLATE FORMED WITH LUBRICATING MEMBERS FOR REDUCING FRICTION CAUSED BY ENGAGEMENT WITH DAMPER SPRINGS

BACKGROUND OF THE INVENTION

1. Field of the Invention

The present invention relates to a damper disc assembly, and more particularly to a damper disc assembly in which spring members are disposed within a rotary plate receiving portion and are provided with lubrication to reduce wear.

2. Description of the Prior Art

A clutch disc assembly for use in an automotive vehicle is typically provided with an input plate, an output hub having a flange integral with its outer circumferential portion, and coil springs for elastically coupling the input plate to the flange of the output hub in the circumferential direction. A plurality of cutaways (rectangular window portions) are formed on the output hub. Raised portions extending in the axial direction are formed in the input plate at positions corresponding to the rectangular window portions. The coil springs are disposed in space defined by cutaway portions and the raised portions. The raised portions are used to limit the radially outward movement of the coil springs and to limit the movement of the coil springs in the axial direction.

In the conventional clutch disc assembly, when the input plate and the output hub are rotated relative to each other, the coil springs repeat compression and expansion in the circumferential direction. In this case, since a centrifugal force caused by the rotation of the clutch disc assembly acts on the coil springs, the coil springs are urged to move to the outer circumferential portions of the cutaway portions of the flange and the raised portions of the input plate. As a result, the flange and the input plate begin to experience wear due to repeated moving contact, thereby shortening the service life of each member.

The above mentioned problems are also experienced in damper disc assemblies that do not include clutch discs, for instance in damper disc assemblies that are used in non-clutch mechanism related torque coupling devices.

SUMMARY OF THE INVENTION

One object of the invention is to provide lubrication in a damper disc assembly for those parts which contact slidable elastic members, especially raised portion of plate members adjacent to the springs in order to reduce wear and prolong the service life of the parts.

In accordance with one aspect of the present invention, a damper disc assembly includes a first rotary plate having a first receiving portion, a second rotary plate disposed concentrically with the first rotary plate, the second rotary plate being rotatable relative to the first rotary plate and having a second receiving portion corresponding to the first receiving portion, and an elastic member disposed within the first receiving portion and the second receiving portion elastically coupling the first rotary plate to the second rotary plate in the circumferential direction. Further, a lubricating portion is provided on at least one surface of one of the first and second rotary plate such that, in response to centrifugal forces the elastic member contacts the lubricating portion.

Preferably, the lubricating portion includes a lubricant-impregnated member fixed to the first rotary plate radially outward from the first receiving portion.

Preferably, the lubricant-impregnated member is provided on two opposite axial surfaces of the first rotary plate radially outward from the first receiving portion.

Preferably, the lubricant-impregnated member is impregnated with a lubricant including at least one material selected from tetrafluoroethylene, graphite, and molybdenum disulfide.

Alternatively, the lubricant may be a lubricant oil.

Preferably, the elastic member is a coil spring where the length of the coil spring in load free state is shorter than a circumferencial length of the first and second receiving portions.

Alternatively, the lubricating portion is a hardened surface layer formed on a radially inner side of the second receiving portion of the second rotary plate.

Alternatively, the lubricating portion is a layer of lubricating material fixed to a radially inner side of the second receiving portion of the second rotary plate.

Alternatively, the lubricating portion includes a plurality of hollows formed on a radially inner side of the second receiving portion of the second rotary plate, each of the hollow having a lubricating material disposed therein, and a layer of lubricating material fixed to the radially inner side of the second receiving portion of the second rotary plate.

Alternatively, the lubricating portion includes a plurality of hollows formed on a radially inner side of the second receiving portion of the second rotary plate, each of the hollow having a lubricating material disposed therein.

In another aspect of the present invention, a damper disc assembly includes a first rotary plate disposed having a plurality of windows formed therein, at least one second rotary plate formed with a plurality of raised portion corresponding to the windows, each of the raised portion extending axially outward from the second rotary plate, the second rotary plate disposed concentrically with and adjacent to the first rotary plate, each of the raised portions formed with a plurality of minute apertures, a radial inner surface of each of the raised portions and surfaces of the minute apertures provided with an hardened surface, and a plurality of elastic members, one elastic member disposed within corresponding ones of the windows and the raised portions elastically coupling the first rotary plate to the second rotary plate in the circumferential direction.

Preferably, the damper disc assembly also includes a third rotary plate formed with a plurality of raised portion corresponding to the windows, each of the raised portion extending axially outward from the third rotary plate, the third rotary plate disposed concentrically with and adjacent to the first rotary plate opposite from the second rotary plate with the first rotary plate positioned between the second and third rotary plates, each of the raised portions formed with a plurality of the minute apertures, a radial inner surface of each of the raised portions and surfaces of the minute apertures provided with a hardened surface.

In another aspect of the invention, a damper disc assembly includes a first rotary plate disposed having a plurality of windows formed therein, at least one second rotary plate having a plurality of raised portions corresponding to the windows, each raised portion extending axially outward from the second rotary plate, the second rotary plate disposed concentrically with and adjacent to the first rotary plate, each of the raised portions provided with a lubrication member, and a plurality of elastic members, one elastic member disposed within corresponding ones of the windows and the raised portions elastically coupling the first rotary plate to the second rotary plate in the circumferential direction, wherein the lubrication members are positioned such that in response to centrifugal forces, the elastic members contact a corresponding one of the lubrication members.

Preferably, each of the raised portions are provided with a plurality of hollows on a radially inner surface and the lubrication member comprises a plurality of lubrication portions, one of the lubrication portions disposed in each of the hollows.

Alternatively, the lubrication member further includes a lubrication layer provided on the radially inner surface.

Alternatively, the lubrication member includes at least one material selected from, graphite, and molybdenum disulfide.

Preferably, the elastic member is a coil spring.

DESCRIPTION OF THE PREFERRED EMBODIMENTS

First Embodiment

Figure 1:
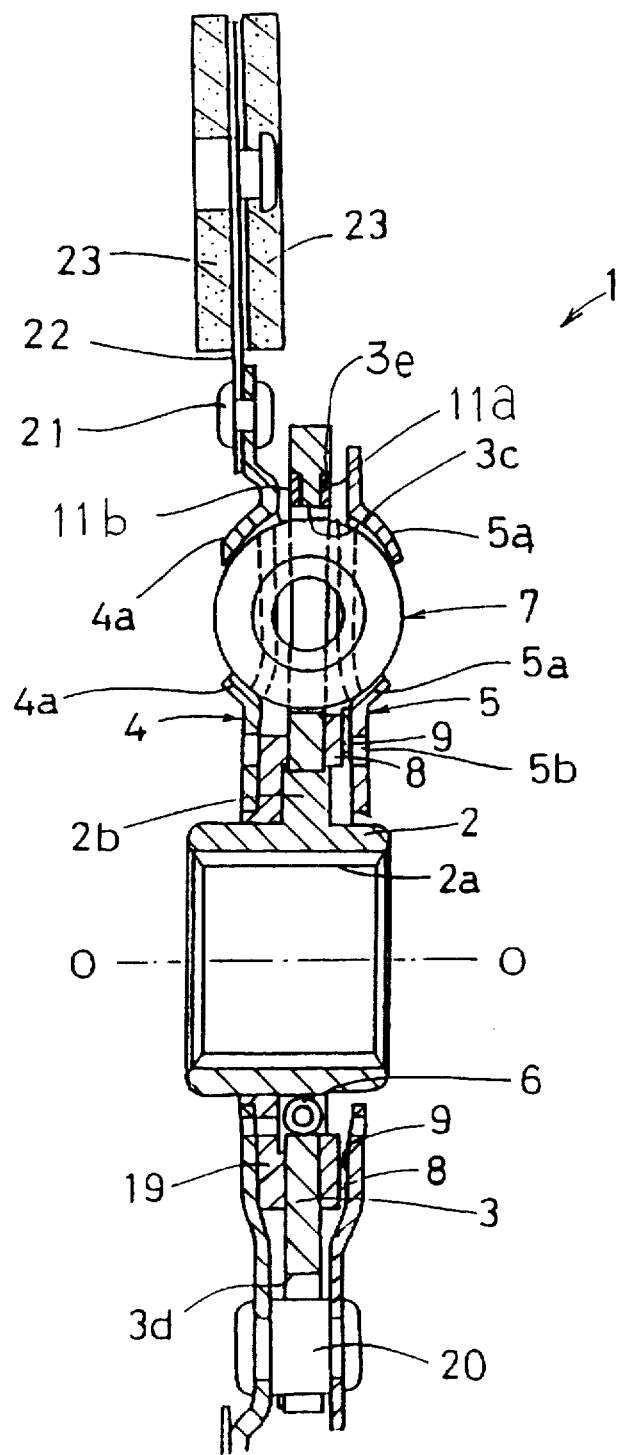
FIG. 1 is a fragmentary, side sectional view showing a clutch disc assembly in accordance with a first embodiment of the present invention.

A clutch disc assembly 1 according to a first embodiment of the present invention is shown in FIG. 1. The clutch disc assembly 1 is used to transmit a torque from an engine (not shown) located on the left side of FIG. 1 to a transmission (not shown) located on the right side of FIG. 1. In FIG. 1, line O—O designates a rotary axis of the clutch disc assembly 1. Also, $R_1$ in FIG. 2 indicates a rotational direction of the clutch disc assembly 1.

Figure 2:
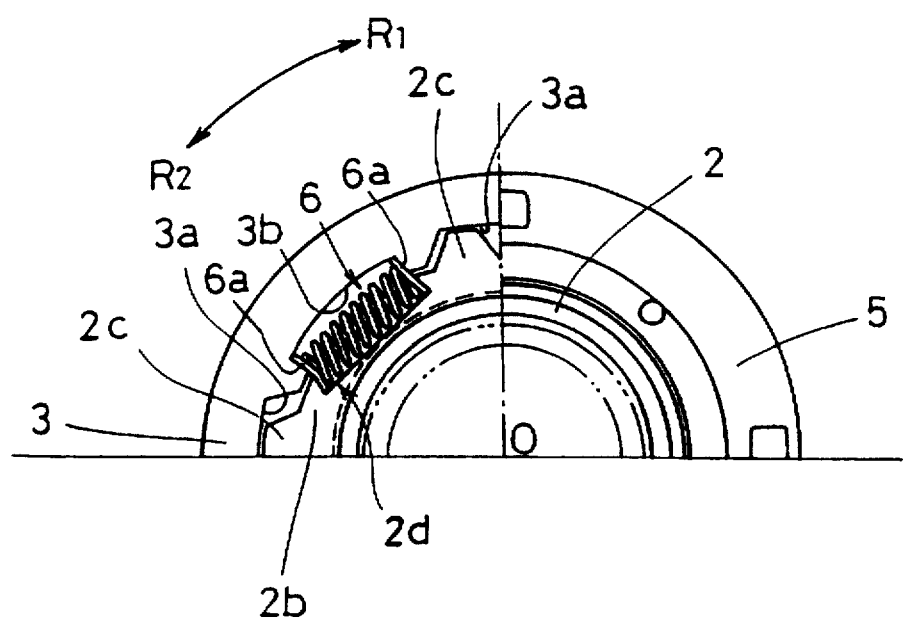
FIG. 2 is an end view of a portion of the clutch disc assembly depicted in FIG. 1, showing a joint portion between a hub and a flange.

A hub 2 which is connectable to a shaft (not shown) of the transmission is disposed at the center of the clutch disc assembly 1. Gear teeth, hereinafter referred to as splines 2a, are formed in a central aperture in a central portion of the hub 2. A small flange portion 2b which extends radially outwardly is formed on the hub 2. A plurality of projections 2c are formed at regular intervals in the circumferential direction on the outer circumference of the flange portion 2b. As shown in FIG. 2, receiving portions 2d are formed by cutting out corresponding portions of the flange portion 2b at two diametrically opposite positions in the flange portion 2b. The receiving portions 2d are configured for receiving small coil springs 6, the small coil springs 6 are described in greater detail below.

A separated flange 3 is disposed on the outer circumference of the projections 2c of the hub. Cutaway portions 3a are formed on the inner circumferential side of the separated flange 3 at positions corresponding to the projections 2c of the hub 2. A predetermined space is defined between the cutaway portions 3a and the projections 2c in the circumferential direction, so that the hub 2 and the separated flange 3 may rotate with respect to one another a predetermined angle about the line O—O. In a torsion free state shown in FIG. 2, the projections 2c are offset with respect to the cutaway portions 3a such that each projection 2c is closer to one circumferential side of the cutaway portion 3a than to the other circumferential side of the cutaway portion 3a. The projections 2c are offset in the direction opposite to the rotational direction in the $R^2$ direction. In other words, the projections 2c are usually positioned off center with respect to the cutaway portions 3a.

Receiving portions 3b are formed on the inner circumferential side of the separated flange 3 by cutting out corresponding portions of the separated flange 3 at two positions corresponding to the receiving portions 2d of the hub 2. The small coil springs 6 are disposed within the receiving portions 2d and 3b. Seat members 6a are disposed at each end of each small coil springs 6. The seat member 6a is maintained in contact with portions of the receiving portions 2d and 3b in the circumferential direction by the biasing force of the spring 6.

Figure 3:
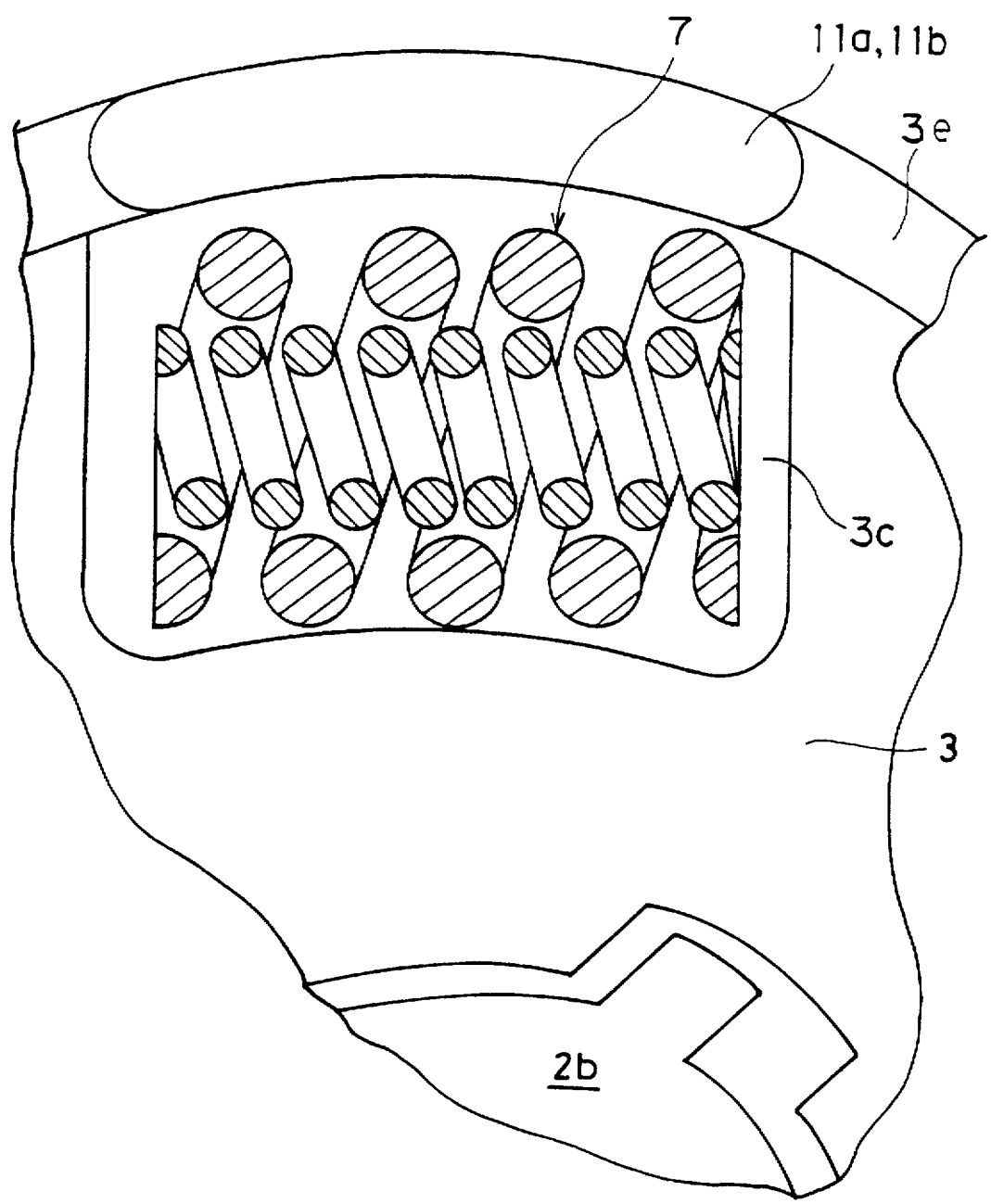
FIG. 3 is a sectional view of a window hole formed in flange depicted in FIG. 2 of the clutch disc assembly depicted in FIG. 1, shown on a slightly enlarged scale.

As shown in FIGS. 1 and 3, radially intermediate portions of the separated flange 3 are formed with a plurality of window holes 3c which extend in the circumferential direction. Circumferential grooves 3e are formed on the radially outward side of the window holes 3c along the outer circumference thereof. Arcuate lubricant-impregnated members 11a and 11b are fixed in the grooves 3e of the outer circumferential portions of the window holes 3c, respectively. The inner circumferential portions of the lubricant-impregnated members 11a and 11b are in alignment with the outer circumferential surfaces of the window holes 3c. The lubricant-impregnated members 11a and 11b may be made of sintered metal or other similar material with tetrafluoroethylene filled in porosities thereof. It should be appreciated that other porous materials could be used or a member made completely of tetrafluoroethylene could also serve as the lubricant-impregnated members 11a and 11b.

Furthermore, a plurality of cutaway portions 3d are formed at regular intervals in the circumferential direction in the outer circumferential edge of the separated flange 3.

A clutch plate 4 and retaining plate 5 are disposed on opposite sides of the separated flange 3. The clutch plate 4 and the retaining plate 5 together define an input plate of the clutch disc assembly 1. The plates 4 and 5 are substantially a pair of disc-like plates that are rotatably engaged with the outer periphery of the hub 2. The plates 4 and 5 are fixed to each other at their outer peripheral portions by contact pins 20. Each pin 20 passes through a cutaway portion 3d of the separated flange 3. A predetermined space is kept in the circumferential direction between the contact pins and the cutaway portions 3d. With this arrangement, the clutch plate 4 and retaining plate 5 and the flange 3 are rotatable relative to each other. However, when the contact pins 20 are brought into contact with either circumferential end of one of the cutaway portions 3d, the relative rotation is restrained.

A plurality of cushioning plates 22 are coupled with the outer peripheral edge of the clutch plate 4 by a plurality of rivets 21. Annular frictional facings 23 are fixed to the cushioning plates 22. Typically, a flywheel (not shown) on the engine side is disposed on the left side of FIG. 1 with respect to the frictional facings 23 when the clutch disc assembly 1 is in service. When the frictional facings 23 and the cushioning plates 22 are in pressing contact with the flywheel (not shown), the torque from the engine (not shown) is transmitted to the clutch disc assembly 1.

The retaining plate 4 and the clutch plate 5 are each formed with raised portions 4a and 5a which extend axially outwardly at positions corresponding to the window holes 3c of the separated flange 3. The raised portions 4a and 5a are formed at radially outward and inward positions on the retaining plate 4 and the clutch plate 5, respectively. A large coil spring 7 is disposed within the raised portions 4a and 5a and each window 3c of the separated flange 3. The large coil spring 7 is larger in diameter than the first coil spring 6 and has a higher rigidity. Preferably, the length of the large coil spring 7 in a load or compression free state, is shorter than the circumferencial length of the window hole 3c as shown in FIG. 3 and no initial load is applied to the large coil spring 7 when installed in the window 3c. Therefore, the large coil spring 7 is in a stress free state when there is no torsional stress on the clutch disc assembly 1. The length of the large coil spring 7 in the load free state is also shorter than the circumferencial length of the raised portions 4a and 5a in a manner similar to the window 3c, thereby no initial load is also applied to the large coil spring 7.

A frictional washer 8 and a conical spring 9 are interposed between the inner circumferential portion of the retaining plate 5 and the inner circumferential portion of the separated flange 3. The washer 8 is engaged with the retaining plate 5 for rotation therewith. The washer 8 is formed with, for instance, axially extending protrusions (not shown) which extend through apertures 5b formed in the retaining plate 5. The conical spring 9 is retained at its outer circumferential edge to the retaining plate 5 and urges the frictional washer 8 to the inner circumferential side face of the separated flange 3 with its inner circumferential edge.

A second frictional washer 19 is engaged with the inner circumferential portion of the clutch plate 4 for rotation therewith. The second frictional washer 19 is in contact with the inner circumferential side face of the separated flange 3 and the flange portion 2b and the projections 2c of the hub 2.

The operation of the clutch disc assembly 1 will now be described.

During the rotation of the clutch disc assembly 1, the large coil spring 7 is moved radially outwardly by the centrifugal force caused by the rotation and is slidably moved along the outer circumferential portion of the window hole 3c of the separated flange 3 and the raised portions 4a and 5a on the outer circumferential side of the plates 4 and 5. Furthermore, the large coil spring 7 is slidably moved along the lubricant-impregnated member 11a and 11b. For this reason, tetrafluoroethylene migrates from the lubricant-impregnated member 11a and 11b to the surface of the large coil spring 7. Furthermore, the tetrafluoroethylene migrates from the large coil spring 7 to the outer circumferential edge of the window hole 3c and the inner surfaces of the raised portions 4a and 5a. As a result, the lubrication is provided between the large coil spring 7 and the window hole 3c and the raised portions 4a and 5a to reduce the wear. Namely, the wear of each component may be reduced. In particular, since the initial load is not applied to the large coil spring 7, the latter may readily be rotated about its axis within the raised portions 4a and 5a. As a result, a large amount of the tetrafluoroethylene fed to the large coil spring 7 is applied to the window hole 3c and the raised portions 4a and 5a.

When the frictional facings 23 are pushed against the flywheel (not shown) on the engine side, the torque of the flywheel on the engine side is inputed into the plates 4 and 5 through the frictional facings 23 and the cushioning plates 22. This torque is transmitted to the hub 2 through the large coil spring 7, the separated flange 3 and the small spring 6 and is further outputed to the shaft (not shown) on the transmission side.

When a small twist vibration is transmitted from the flywheel on the engine side to the clutch disc assembly 1 producing a small angular displacement, a relative rotation is generated between the plates 4 and 5 and the separated flange 3 and the hub 2. At this time, the small coil spring 6 is repeatedly compressed and expanded in the circumferential direction. In this case, the twist vibration of the small angular displacement is attenuated by the characteristics of the low rigidity and the low friction. In this case, since the friction is hardly generated between the large coil spring 7 and the plates 4 and 5 as described above, the characteristics of low friction are stabilized.

When a relatively large twist vibration which produces a large angular displacement is transmitted to the clutch disc assembly 1, the separated flange 3 and the hub 2 are rotated together, a relative rotation is generated between these components and the plates 4 and 5. At this time, the large coil spring 7 is repeatedly compressed and expanded in the circumferential direction, so that the first frictional washer 8 is slidably moved along the separated flange 3 to generate a large frictional force. Due to the above--described high rigidity/large friction characteristics, the twist vibration of large angular displacement may be effectively attenuated.

In this, arrangement, since the lubricant-impregnated member 11a and 11b are fixed on the side surfaces of the separated flange 3, manufacturing of the clutch disc assembly 1 may be simplified.

The friction produced between the large coil spring 7 and the plates 4 and 5 is reduced due to the lubrication from the lubricant-impregnated member 11a and 11b, compared to prior art configurations without such lubrication, and hence wear between the various sliding parts is reduced. For this reason, the service life of the separated flange 3 and the plates 4 and 5 may be prolonged.

Second Embodiment

Figure 4:
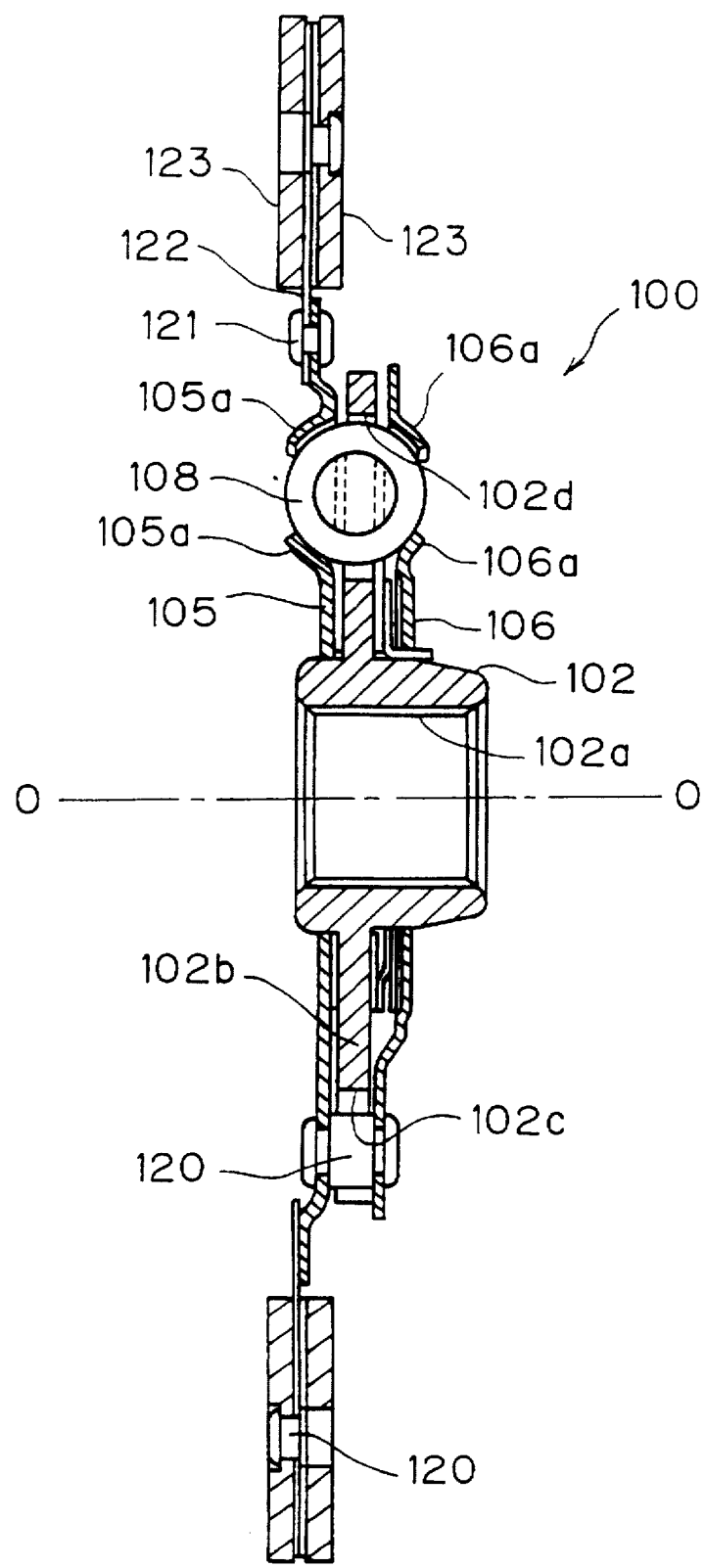
FIG. 4 is a side sectional view similar to FIG. 1, showing a damper disc assembly in accordance with a second embodiment of the present invention.

A clutch disc assembly 100 according to the second embodiment of the present invention is shown in FIG. 4. As with the first embodiment, the clutch disc assembly 100 is used to transmit a torque from an engine (not shown) located on the left side of FIG. 4 to a transmission (not shown) located on the right side of FIG. 4. In FIG. 4, line O—O designates a rotary axis of the clutch disc assembly 100.

A spline hub 102 which is connectable to a shaft (not shown) of the transmission is disposed at the center of the clutch disc assembly 100. Gear teeth, hereinafter referred to as splines 102a, are formed in a central aperture in a central portion of the spline hub 102. A small flange portion 102b which extends radially outwardly is formed on the spline hub 102. In radially intermediate portions of the flange portion 102b, a plurality of radially extending window holes 102d are formed. Further, a plurality of cutouts 102c are formed at regular intervals in the circumferential direction on the outer circumferential end of the flange portion 102b.

A clutch plate 105 and retaining plate 106 are disposed on opposite sides of the flange portion 102b of the spline hub 102. The clutch plate 105 and retaining plate 106 define an input member. The plates 105 and 106 are substantially a pair of disc-like plates that are rotatably engaged with the outer periphery of the spline hub 102. The clutch plate 105 and the retaining plate 106 are formed with raised portions 105a and 106a, respectively, on axially outward portions thereof at the positions corresponding to the window holes 102d of the flange portion 102b. A torsion spring 108 is disposed within the raised portions 105a and 106a and window hole 102d of the flange portion 102b. The plates 105 and 106 are fixed to each other at their outer peripheral portions by contact pins 120.

Figure 5:
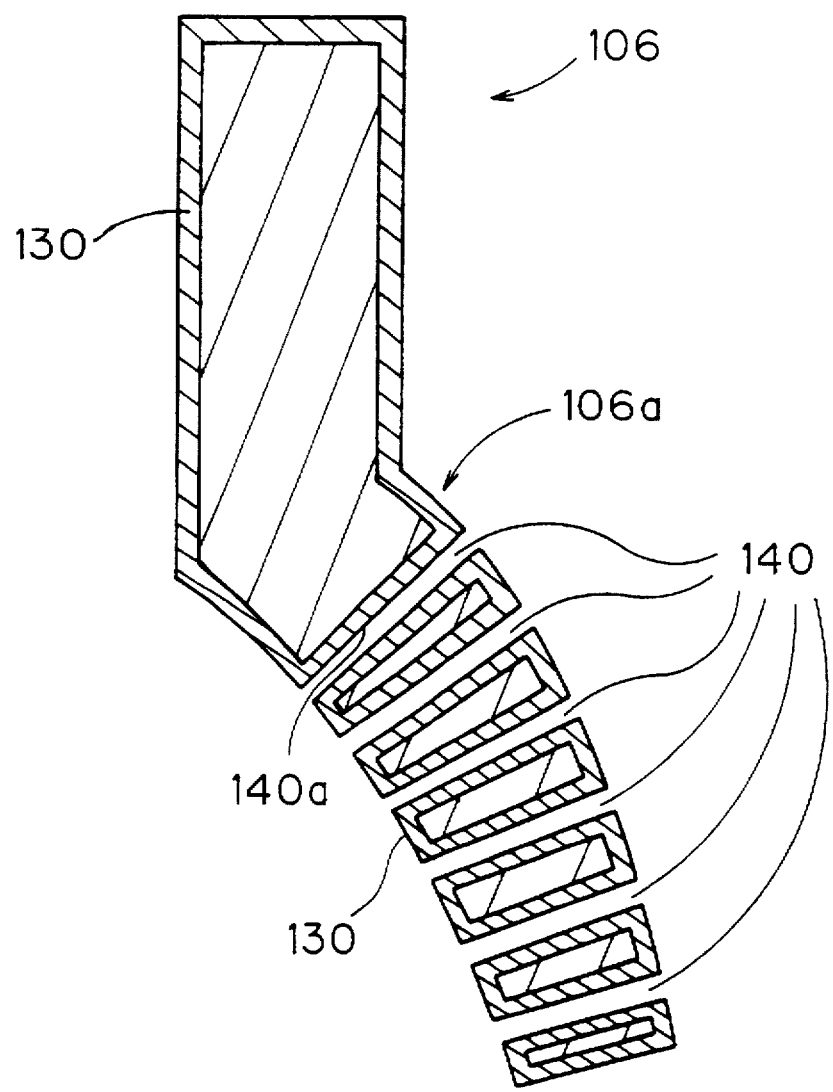
FIG. 5 is a sectional view showing a retaining plate of the damper disc assembly depicted in FIG. 4, shown on a slightly enlarged scale.

The retaining plate 106 is surface hardened by, for instance, carburizing, thus forming a hardened surface layer 130 shown in FIG. 5. Further, the raised portion 106a of the plate 106 are provided with a plurality of minute apertures 140 thus penetrating the raised portion 106a. Therefore, the inner surfaces of each minute apertures 140 are also surface hardened and thus have a hardened surface layer 140a. The clutch plate 105 is likewise provided with a hardened surface layer, although not specifically shown. The hardened surface layer on the clutch plate 105 is generally the same as the hardened surface layer 130 formed on the retaining plate 106. The clutch plate 105 is also formed with a plurality of minute apertures, similar to the minute apertures 140 described above with respect to the retaining plate 106, and the minute apertures of the clutch plate 105 further have a hardened surface layer similar to the layer 140a described above.

In this case, since the raised portions 105a and 106a of the plates 105 and 106 are provided with a hardened surface layer 130, it is possible to reduce the wear of the parts of the raised portions 105a and 106a which contact slidably the torsion spring 108 (on the left side of the raised portion 6a in FIG. 5). Furthermore, the surface hardened layer of the raised portions 105a and 106a of the plates 105 and 106 is relatively thick. Therefore, when the raised portions 105a and 106a contact the torsion spring 8, the hardened surface layer 130 prolongs the service life of the plates 105 and 106 by resisting wear.

A plurality of cushioning plates 122 are coupled with the outer peripheral edge of the clutch plate 105 by a rivet 121. Annular frictional facings 123 are fixed to the cushioning plates 122. A flywheel (not shown) on the engine side is disposed on the left side of FIG. 4 with respect to the frictional facings 123. When the frictional facings 123 and the cushioning plates 122 are in pressing contact with the flywheel (not shown), the torque on the engine side is transmitted to the clutch disc assembly 100.

In the clutch disc assembly 100, during the rotation, the centrifugal force caused by rotation acts on the torsion spring 108, so that it is moved radially outwardly. Then, the torsion spring 108 is slidably moved along the outer circumferential surface of the window hole 102d of the flange portion 102b and the inner circumferential surface of the raised portions 105a and 106a. However, as described above, the inner circumferential surface of the raised portions 105a and 106a is subjected to a surface hardening treatment thus forming the hardened surface layer 130, therefore, the wear of the plates 105 and 106 due to the friction engagement between the plate 105 and 106 and the torsion spring 108 is reduced. For this reason, the service life of the plates 105 and 106 may be prolonged.

Third Embodiment

Figure 6:
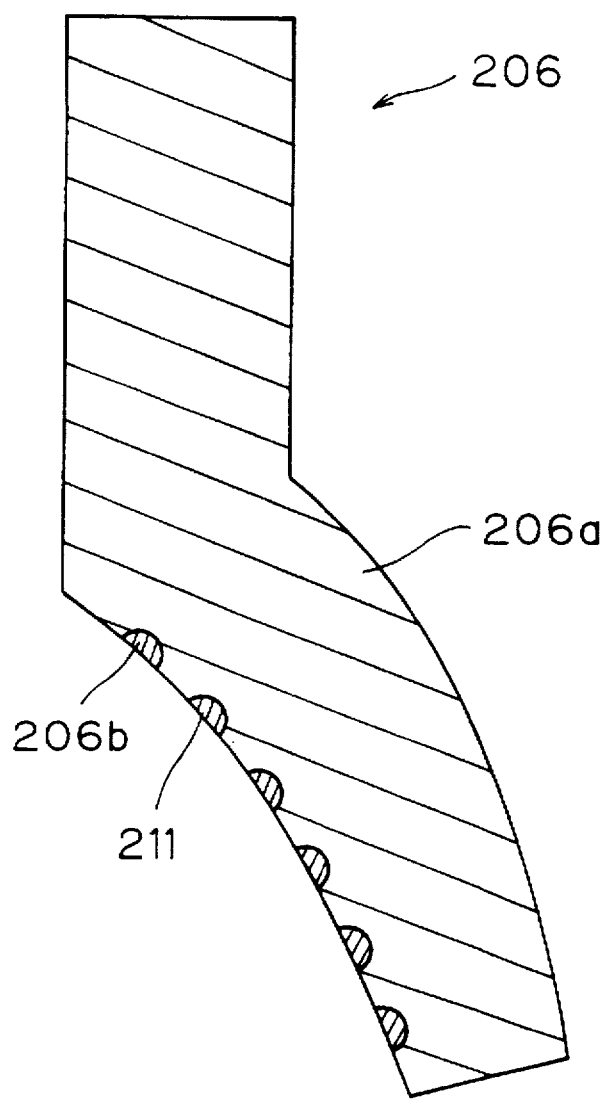
FIG. 6 is a sectional view similar to FIG. 5, showing a retaining plate in accordance with a third embodiment of the present invention.

In third embodiment, a clutch disc assembly is constructed in a manner similar to the above described embodiments, but is alternatively formed with a retaining plate 206 shown in FIG. 6. The retaining plate 206 includes a plurality of hollows 206b formed on the surface of a raised portion 206a which partially surrounds a torsion spring such as the spring 108 described above with respect to the previous embodiment and shown in FIG. 4. A solid lubricant 211 such as Solvest® fills each hollows 206b. Here, a corresponding clutch plate (not shown) has generally the same configuration as the retaining plate 206.

When a torsion spring, such as the torsion spring 108 undergoes movement and contact along the solid lubricant 211 as well as the retaining plate 206 and the clutch plate, the solid lubricant 211 provides lubrication between the contacting surfaces. Specifically, the solid lubricant 211 migrates to the surface of the torsion spring 108. Furthermore, the solid lubricant 11 migrates from the torsion spring 108 to the outer circumferential edge of the corresponding window hole, such as the window hole 102d shown in FIG. 4 and the inner surfaces of the raised portions 106a in the retaining plate 206 and the inner surface of the raised portion of a corresponding clutch plate (not shown). As a result, the lubrication is provided between the torsion spring 108 and the raised portion 206a to reduce the wear.

Fourth Embodiment

Figure 7:
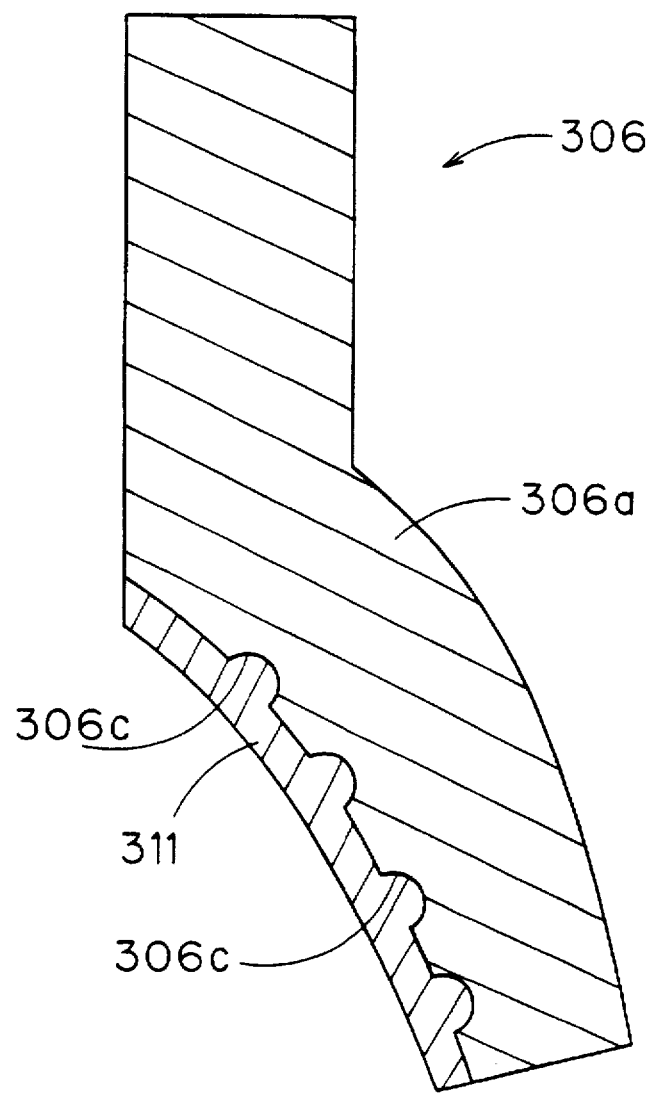
FIG. 7 is a sectional view similar to FIGS. 5 and 6, showing a retaining plate in accordance with a forth embodiment of the present invention.

In a fourth embodiment of the present invention, a clutch disc assembly is constructed in a manner similar to the above embodiment, with many of the same components. However, in accordance with the fourth embodiment a retaining plate 306, shown in FIG. 7, is formed with a plurality of hollows 306c on a portion of an inner surface of a raised portion 306a. The retaining plate 306 serves a structural purpose similar to the retaining plate 5 described above with respect to the first embodiment shown in FIG. 1 and also serves a structural purpose similar to the retaining plate 106 shown in FIG. 4 with respect to the second embodiment. For instance, the retaining plate 306 includes the raised portion 306a for retaining a spring such as the spring 108 shown in FIG. 4.

The raised portion 306a therefore regularly contacts the torsion spring during usage of the associated clutch disc assembly. A solid lubricant 311 fills each of the hollows 306c, as shown in FIG. 7. Further, the entire inner surface of the raised portion 306a is coated with the solid lubricant 311. When the torsion spring 108 is urged into contact with the raised portion 306a, the torsion spring instead contracts the solid lubricant 311. It should further be appreciated, that a corresponding clutch plate, such as the clutch plate 105 in FIG. 4, is also formed in a manner similar to the configuration of the retaining plate 306 shown in FIG. 7.

In this embodiment, when the torsion spring 108 is slidably moved along the retaining plate 306 and the corresponding clutch plate, the spring contact the solid lubricant 311 to reduce wear. Further, when the solid lubricant 311 on the inner surface of the raised portion 306a has worn away, the portions of the solid lubricant 311 remaining in hollows 6c provides further lubrication. As a result, the lubrication is enhanced between the torsion spring 108 and the raised portion 306a and associated raised portion of a corresponding clutch disc (not shown) to reduce the wear.

Other solid lubricants such as graphite or molybdenum disulfide may be used instead of the above-described lubricant. These solid lubricants may be used in the mixture of oil or grease. Also, ordinary liquid lubricants such as oil or grease may also be used.

It is also possible to use other porous material such as grown cast iron or synthetic resin as the lubricant-impregnated member.

Although the minute apertures 140 penetrate the raised portion 6a in the second embodiment described above, the arrangement may also be that the minute apertures 140 need not penetrate the raised portion 106a, but only extend partially therethrough.

Although the solid lubricant is filled in the hollows in the third and fourth embodiments described above, the arrangement may also be that a lubricant-impregnated member made of the sintered metal, the porosities of which are impregnated with lubricant, may be filled in the hollows.

ADVANTAGES OF THE INVENTION

In the clutch disc assembly according to the first embodiment of the present invention, it is possible to provide lubricant from a lubricant-impregnated member to the elastic member or spring by bringing the elastic member into contact with the lubricant-impregnated member. As a result, the friction between the elastic member and corresponding contacting members are not so easily worn. The service life of each member may be prolonged.

Since the lubricant-impregnated member is disposed radially outwardly from the elastic member, the centrifugal force of the rotation causes the elastic member moved radially outwardly to slidably move the lubricant-impregnated member. Here, it is possible to supply the lubricant to the elastic member with a simple structure.

Since the lubricant-impregnated member is provided on a part of the second rotary plate at radially outward portion of said second receiving portion, the lubricant-impregnated member may be simply fixed to either first rotary plate or second rotary plate.

Since no initial load is applied to the coil spring, the coil spring itself is likely to rotate about its own axis. For this reason, the coil spring is slidably moved along and on the lubricant-impregnated member and rotated while being partially subjected to the lubricant on its surface to thereby feed the lubricant to the first receiving portion and the second receiving portion. As a result, the lubrication is further enhanced between the coil spring and the receiving portions for the two plates.

In the clutch disc assembly according to the second embodiment of the present invention, it is possible to reduce the wear of those parts which contact slidable the elastic member, since the supporting portion of the first rotary plate is provided with a hardened surface layer. Moreover, since each plate is provided with a plurality of the minute apertures, the hardened surface layer is deeply formed, thereby prolonging the service life of the rotary plates.

In the clutch disc assembly according to the third and the forth embodiments of the present invention, it is possible to reduce the wear of the plates due to the repeated moving contact of the elastic member, since the lubricant is applied on the surfaces contactable with the elastic member.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A damper disc assembly comprising:

a first rotary plate having a first receiving portion, said first rotary plate formed with opposite radially and circumferentially extending surfaces, a portion of each of said extending surfaces radially outward from and adjacent to said first receiving portion being formed with circumferentially extending recesses;

a pair of second rotary plates disposed concentrically on either side of said first rotary plate, said second rotary plates being rotatable relative to said first rotary plate and having second receiving portions corresponding to said first receiving portion;

an elastic member disposed within said first receiving portion and said second receiving portions elastically coupling the first rotary plate to said second rotary plates in the circumferential direction; and a pair of lubricant-impregnated members disposed in said circumferentially extending recesses such that, in response to centrifugal forces said elastic member contacts said lubricant-impregnated members.

2. The damper disc assembly according to claim 1, wherein said lubricant-impregnated members are impregnated with a lubricant including at least one material selected from the group consisting of lubricant oil tetrafluoroethylene, graphite, and molybdenum disulfide.

3. The damper disc assembly according to claim 2, wherein said lubricant comprises said lubricant oil.

4. The damper disc assembly according to claim 1, wherein said elastic member comprises a coil spring.

5. The damper disc assembly according to claim 4, wherein the length of said coil spring in a load free state is shorter than a circumferencial length of said first and second receiving portions.

6. A damper disc assembly comprising:

a first rotary plate having a plurality of windows formed therein;

at least one second rotary plate formed with a plurality of raised portions corresponding to said windows, each of said raised portions extending axially outward from said second rotary plate, said second rotary plate disposed concentrically with and adjacent to said first rotary plate, each of said raised portions formed with a plurality of minute apertures, a surface of each of said raised portions and surfaces of said minute apertures provided with a hardened surface; and a plurality of elastic members, one elastic member disposed within corresponding ones of said windows and said raised portions, said elastic members elastically coupling said first rotary plate to said second rotary plate in the circumferential direction.

7. The damper disc assembly as set forth in claim 6, further comprising a third rotary plate formed with a plurality of raised portions corresponding to said windows, each of said third rotary plate raised portions extending axially outward from said third rotary plate, said third rotary plate disposed concentrically with and adjacent to said first rotary plate opposite from said second rotary plate with said first rotary plate positioned between said second and third rotary plates, each of said third rotary plate raised portions formed with a plurality of minute apertures, a surface of each of said third rotary plate raised portions and surfaces of said minute apertures provided with a hardened surface.

8. A damper disc assembly comprising:

a first rotary plate having a plurality of windows formed therein;

at least one second rotary plate having a plurality of raised portions corresponding to said windows, each of said raised portions extending axially outward from said second rotary plate, said second rotary plate disposed concentrically with and adjacent to said first rotary plate each of said raised portions provided with a lubrication member; and a plurality of elastic members, one elastic member disposed within corresponding ones of said windows and said raised portions elastically coupling said first rotary plate to said second rotary plate in the circumferential direction;

wherein said lubrication members are positioned such that in response to centrifugal forces, said elastic members contact said raised portions and each of said raised portions is provided with a plurality of hollows on a surface thereof and each said lubrication member comprises a plurality of lubrication portions, one of said lubrication portions disposed in each of said hollows.

9. The damper disc assembly according to claim 8, wherein each said lubrication member further comprises a lubrication layer provided on said surface.

10. The damper disc assembly according to claim 8, wherein each said lubrication member comprises at least one material selected from the group consisting of graphite, and molybdenum disulfide.

11. The damper disc assembly according to claim 8, wherein each said elastic member comprises a coil spring.

* * * * *